(12) United States Patent
Hugon et al.

(10) Patent No.: US 9,193,433 B2
(45) Date of Patent: Nov. 24, 2015

(54) DOUBLE-SIDED STIFFENED COMPOSITE PANEL AND METHOD FOR PRODUCING SUCH A PANEL

(75) Inventors: Michael Hugon, Pont Saint Martin (FR); Alexandre Pelard, Amboise (FR); Dominique Soubelet, Nazelles (FR)

(73) Assignee: DAHER AEROSPACE, Saint Julien de Chedon (FR)

( * ) Notice: Subject to any disclaimer, the term of this patent is extended or adjusted under 35 U.S.C. 154(b) by 0 days.

(21) Appl. No.: 14/118,287

(22) PCT Filed: May 19, 2012

(86) PCT No.: PCT/EP2012/059316
§ 371 (c)(1), (2), (4) Date: Nov. 18, 2013

(87) PCT Pub. No.: WO2012/156525
PCT Pub. Date: Nov. 22, 2012

(65) Prior Publication Data
US 2014/0079903 A1 Mar. 20, 2014

(30) Foreign Application Priority Data
May 19, 2011 (FR) .................................... 11 01547

(51) Int. Cl.
*B29C 65/00* (2006.01)
*B64C 1/06* (2006.01)
(Continued)

(52) U.S. Cl.
CPC ............... *B64C 1/06* (2013.01); *B29C 65/4815* (2013.01); *B29C 65/5057* (2013.01); *B29C 65/5078* (2013.01); *B29C 66/112* (2013.01); *B29C 66/131* (2013.01); *B29C 66/474* (2013.01); *B29C 66/494* (2013.01); *B29C 66/524* (2013.01); *B29C 66/72141* (2013.01); *B29C 66/73116* (2013.01); *B29C 66/73921* (2013.01);
(Continued)

(58) Field of Classification Search
CPC ............ B64C 1/06; B64C 1/068; B64C 1/12; B29C 65/5057; B29C 66/73116; B29C 66/91943; B29C 66/91945
USPC .......... 428/105; 156/285, 286, 297, 298, 299, 156/306.6, 308.2, 309.6; 244/117 R, 119
See application file for complete search history.

(56) References Cited

U.S. PATENT DOCUMENTS 2,765,837 A * 10/1956 Kenyon ..................... 100/326
5,190,773 A    3/1993 Damon
(Continued)

FOREIGN PATENT DOCUMENTS

DE    102007038926 B3    2/2009
DE    102008008200 A1    8/2009
(Continued)

*Primary Examiner* — John Goff
(74) *Attorney, Agent, or Firm* — IM IP Law PLLC; C. Andrew Im

(57) ABSTRACT

A stiffened panel and method for producing such a panel comprising a laminated skin extending in two directions, made of a resin and a continuous fibers reinforcement. A first stiffener in the form of a beam is made of a resin with continuous fibers reinforcement and extends on a first side of the laminated skin in a first direction. A second stiffener in the form of a beam is made of a resin with continuous fibers reinforcement and extends on a second side of the laminated skin in a second direction. The resins which make up the skin and the stiffeners are thermoplastic in nature and the stiffeners are closely joined to the skin by welding.

6 Claims, 2 Drawing Sheets

(51) Int. Cl.
  *B29C 65/50* (2006.01)
  *B29C 70/34* (2006.01)
  *B29D 99/00* (2010.01)
  *B29C 65/48* (2006.01)
  *B29L 31/30* (2006.01)

(52) U.S. Cl.
  CPC ..... *B29C 66/91411* (2013.01); *B29C 66/91445* (2013.01); *B29C 66/91931* (2013.01); *B29C 66/91935* (2013.01); *B29C 70/342* (2013.01); *B29D 99/0014* (2013.01); *B29C 66/71* (2013.01); *B29C 66/7212* (2013.01); *B29L 2031/3076* (2013.01); *Y02T 50/433* (2013.01); *Y10T 156/10* (2015.01); *Y10T 428/24058* (2015.01)

(56) References Cited

U.S. PATENT DOCUMENTS

| | | |
|---|---|---|
| 5,368,807 A | 11/1994 | Lindsay |
| 6,613,258 B1 * | 9/2003 | Maison et al. ............... 264/102 |
| 6,684,593 B2 * | 2/2004 | Brenneis et al. ............... 52/630 |
| 2007/0095474 A1 * | 5/2007 | Weller et al. ............... 156/309.6 |
| 2008/0111024 A1 * | 5/2008 | Lee et al. ............... 244/121 |
| 2009/0047471 A1 | 2/2009 | Kellenberger |
| 2009/0283638 A1 | 11/2009 | Arevalo Rodriguez et al. |

FOREIGN PATENT DOCUMENTS

| | | | | |
|---|---|---|---|---|
| EP | 1149687 A2 * | 10/2001 | ............. | B29C 70/34 |
| WO | WO 2008039168 A2 * | 4/2008 | | |

* cited by examiner

DOUBLE-SIDED STIFFENED COMPOSITE PANEL AND METHOD FOR PRODUCING SUCH A PANEL

RELATED APPLICATIONS

This application is a §371 application from PCT/EP2012/059316 filed May 19, 2012, which claims priority from French Patent Application No. 11 01547 filed May 19, 2011, each of which is herein incorporated by reference in its entirety.

TECHNICAL FIELD OF THE INVENTION

The invention relates to a double-sided stiffened composite panel and a method for producing such a panel. It is more particularly but not exclusively suitable for making a panel or a shell structure that does not comprise an aerodynamic surface for aeronautics applications. As a non-limitative example, it may be a bulkhead, a pressure baffle or a spar.

The panel according to the invention is remarkable in that it comprises cross stiffening that enables it to withstand buckling stresses, as the stiffeners are assembled to the skin of said panel with no fastening elements such as rivets.

Said panel is also remarkable in that it is made of composite material with continuous fiber reinforcement in a thermoplastic matrix, giving it fire and impact resistance properties that meet aeronautics requirements.

BACKGROUND OF THE INVENTION

According to the prior art, a stiffened composite panel is made of a thermosetting resin with continuous fiber reinforcement. It includes a skin that is stiffened, firstly, by longitudinal stiffeners called stringers and secondly by stiffeners extending along a direction perpendicular to said longitudinal direction, generally on the same side. The techniques of implementation of composite materials do not make it possible to apply such cross stiffening with single lengths of continuous stiffeners. Thus, to achieve that characteristic, when the stiffeners are placed on the same side of the panel, a first series of stiffeners, for example longitudinal stiffeners, are simultaneously co-cured, glued or simultaneously draped with the skin; for their part, the stiffeners that are orthogonal to them are assembled onto the skin by rivet type fasteners with cleats that are themselves riveted or glued to the skin. That panel manufacturing mode implies that it is made in several distinct assembly steps. Besides, it implies specific problems relating to the low peening resistance of the composite material which makes it necessary to oversize the rivets and increase the thicknesses at the fasteners, and thus increase the mass of the finished panel.

To remedy that drawback of the prior art, when the panel does not comprise an aerodynamic side, the continuous orthogonal stiffeners are advantageously placed on both sides of the skin. While that configuration makes it possible to achieve cross stiffening by continuous stiffeners without using intermediate cleats or fasteners, as said stiffeners are placed on each side of the thickness of the skin, making the stiffeners by direct drape forming or by adding them by simultaneous curing is very delicate since it makes it necessary to handle a non-consolidated pre-form while turning it over and to place and to position it in a complex tooling. Such a panel has a high manufacturing cost and the many manufacturing steps constitute as many sources of dispersion liable to lead to manufacturing quality defects.

The document EP 1 149 687 describes a composite panel stiffened by orthogonal stiffeners fixed by welding on the same side of the panel.

OBJECT AND SUMMARY OF THE INVENTION

The invention remedies the drawbacks of the prior art by disclosing a stiffened panel comprising:
a. a laminated skin extending in two directions, made of a resin and a continuous fibre reinforcement;
b. a first stiffener in the form of a beam made of a resin with continuous fibre reinforcement, said first stiffener extending on a first side of said skin in a first direction;
c. a second stiffener in the form of a beam made of a resin with continuous fibre reinforcement, said second stiffener extending on a second side of said skin in a second direction;
d. wherein the resins making up the skin and the stiffeners are thermoplastic in nature and said stiffeners are closely joined to the skin by welding.

In the entire text, the term skin designates a part that is flat or shaped like a shell, with a thickness that is, by order of magnitude, less than $1/1000^{th}$ of the smaller dimension defining its surface.

Thus, the panel according to the invention can be made from elements, skin and stiffeners, that are consolidated and easy to handle and can be assembled without fasteners. However, the presence of stiffeners on the two sides makes that assembly operation difficult. That is because it makes it necessary to raise the temperature of the material to a temperature that is at least equal to the melting temperature of the resin and to apply a contact pressure at the interface between the stiffeners and the skin. Placed in those conditions, both the stiffeners and the skin can undergo decompaction leading to quality defects such as squeezing of resin, in the zones subjected to the pressure required for welding, or shape distortions, because of the shearing introduced by the pressure applied at the interfaces with the stiffeners on the two opposite sides of the skin.

These difficulties are further amplified if the resins making up the skin or stiffeners swell at their melting temperature. That is why the invention also relates to a method for producing such a stiffened panel, said method comprising the steps of:
a. drape forming the skin from a fiber reinforcement impregnated with a first thermoplastic resin having a first melting temperature $Tf_1$;
b. integrating in the drape forming on the outer sides of said skin and at the future location of the stiffeners, a band of film of a second thermoplastic resin said second resin:
  i. being at least partly miscible in the first resin;
  ii. having a melting temperature $Tf_2 < Tf_1$;
  iii. not being degraded when it is taken to a temperature $Tf_1$
c. compacting and consolidating the skin that has thus been drape formed
d. making the stiffeners from a continuous fiber reinforcement impregnated with the first resin;
e. assembling the skin and the stiffeners, both in the compacted consolidated state, by applying contact pressure on said stiffeners placed on the skin at the intended locations and by raising the temperature of the assembly to a temperature $Tf_2$ so as to make a weld.

Thus, the weld is made by raising the temperature of the skin and stiffener assembly to a temperature $Tf_2$ at which they retain their bond. The miscibility of the resins ensures strong bonding of the interface between the skin and the stiffeners.

The invention can be implemented according to the advantageous embodiments described below, which may be considered individually or in any technically operative combination.

According to an embodiment of the panel in the invention, the first and second directions are orthogonal. Thus, the panel is particularly resistant to buckling stresses.

Advantageously, at least one of the stiffeners is joined to the skin by two parallel surfaces. Such a stiffener is more stable with respect to warping and buckling. That characteristic is generally not achievable in the case of a stiffener assembled to the skin by riveting, because of the excessively small distance between the rivets joining each side of the stiffener, which distance is not compatible with the composite constitution of the skin.

According to one advantageous embodiment of the method of the invention, the step (d) of said method includes the integration of a layer made of the second resin on the surfaces of the stiffeners in contact with the skin. Thus, the weld is made more easily and the interface bonding is improved.

According to that same advantageous embodiment of the method of the invention, the stiffeners are made by stamping a pre-consolidated blank and the layer of second resin is also formed during that stamping operation. The making of stiffeners by stamping is particularly productive and, using pre-consolidated blanks, limits the risk of defects in the stiffeners. The nature of the two resins makes it possible to easily integrate the resin with the lower melting temperature during stamping and thus firstly to obtain a strong bond between that layer and the remainder of the part and secondly to ensure the continuity of said layer over the entire contact surface between the stiffener and the skin.

Advantageously, the method according to the invention includes, between steps (d) and (e), a step of:

f. placing a strip made of the second resin on the skin at the location of the stiffeners before said stiffeners are applied to said skin.

That step makes it possible to improve the quality of the weld and make up for any slight defects in the alignment between the effective position of the stiffeners and the position of the zones comprising the second resin made while manufacturing the skin.

Advantageously, the first resin is a polyetheretherketone and the second resin is a polyetherimide. These two resins have the required characteristics (i) to (iii) and further, offer the benefit of fire behaviour and resistance to chemical attacks that are compatible with aeronautics applications.

According to one embodiment suitable for manufacturing a panel that is required to withstand particularly aggressive chemicals such as the phosphate esters that are used as hydraulic fluid in aeronautics applications, the method according to the invention comprises after step (e) a step of:

g. depositing a sealing agent on the edges of the stiffeners at their interface with the skin.

Thus, the weld is protected from possible chemical attacks that could be the result of the spilling of such fluids on the panel in the invention.

The invention also relates to a tooling for implementing the method according to the invention in order to make a panel including at least one stiffener comprising parallel weld surfaces with the skin, wherein said tooling comprises an inflatable core adapted to be inserted between the parallel surfaces of the stiffener in contact with the skin, inside said stiffener.

Thus, the pressure required for welding can be applied on each side of the skin without risking the collapse of said stiffener, and said core can be easily removed after the welding operation.

BRIEF DESCRIPTION OF THE DRAWINGS

The invention is described below in its preferred embodiments, which are not limitative in any way, and by reference to FIGS. 1 to 5, wherein.

DETAILED DESCRIPTION OF THE EMBODIMENTS

Figure 1:
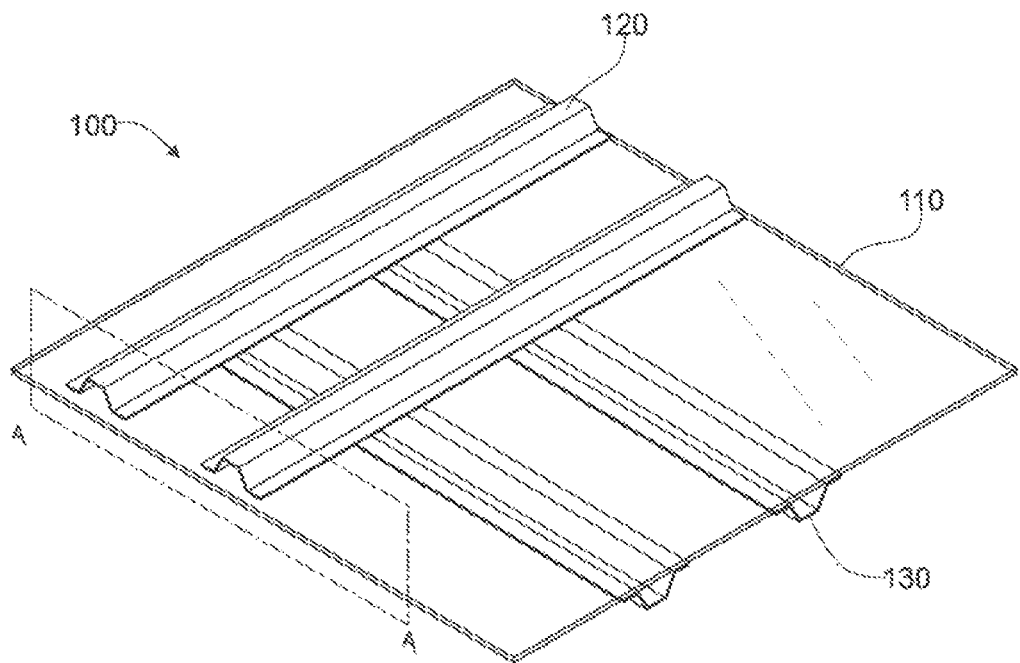
FIG. 1 is a perspective top view of an exemplary embodiment of a stiffened panel according to invention, where the skin of said panel is shown to be transparent.

In FIG. 1 of an exemplary embodiment of the stiffened panel (100) according to the invention, said panel comprises a skin (110) shown flat here but which may have any shape with a single or double curvature, with curvature radiuses greater by order of magnitude than 1000 times the thickness of said skin. Said skin (110) is, in one advantageous exemplary embodiment, made of a laminate of continuous carbon fibers plies in a thermoplastic matrix of polyetheretherketone such as PEEK APC2/AS4 composite. That skin is stiffened by stiffeners (120) extending along a first direction on one of the sides of the skin and by stiffeners (130) extending in a direction perpendicular to the first direction on the opposite side of the skin. In this advantageous embodiment, the stiffeners (120, 130) have an Ω (the Greek letter omega) shape and are joined to the skin by two support surfaces parallel to each other. Said stiffeners (120, 130) are advantageously constituted of carbon fibers plies in a polyetheretherketone matrix, obtained by stamping a pre-consolidated blank.

Figure 2:
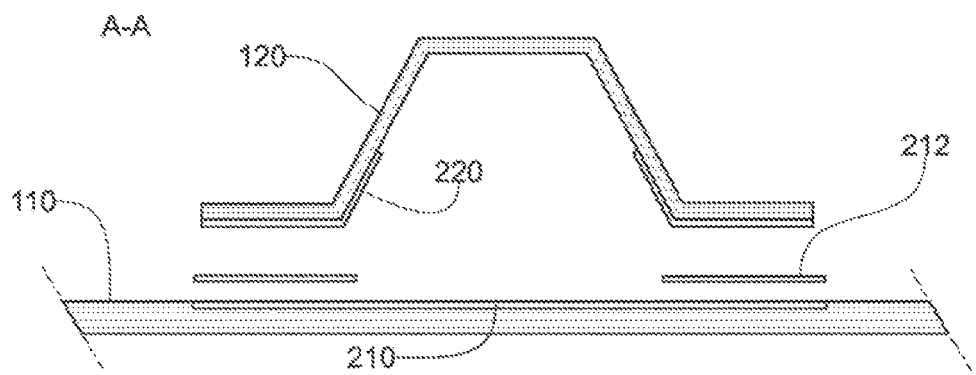
FIG. 2 is an exploded front view of the section A-A defined in FIG. 1 of the assembly of the stiffeners with the skin according to one exemplary embodiment of the invention.

In FIG. 2 of a sectional view, the skin (110) is made by consolidating a stack of plies powdered with resin or calendered with a thermoplastic film. During the skin drape forming operation, a film (210) of a resin that is miscible in the first resin is integrated into the stack before the assembly is compacted and consolidated. As an example, that strip of resin is made of polyetherimide, such as of the Ultem® 5000 type distributed by GE Plastics. The skin (110) is consolidated and compacted at the melting temperature $Tf_1$ of the polyetheretherketone resin that goes into the make-up of the skin (110). Such a film (220) is also integrated into the stiffeners (120, 130) on their sides intended to be welded with the skin (110). According to an advantageous exemplary embodiment, said film is deposited on the pre-consolidated blank, which is hot stamped to make said stiffener. Such a stamping operation is carried out at a temperature equal to or greater than the melting temperature $Tf_1$ of the resin that makes up said blank. The fusion temperature $Tf_2$ of the polyetherimide films (210, 220), placed both on the skin and on the stiffener, being less than temperature $Tf_1$, said film (210, 220) is melted both during the operation of compacting and consolidating of the skin and during the stamping operation of the stiffener (120, 130). Said film (210, 220) is selected in a composition that is at least partly miscible in the resin that makes up the skin (110) and the stiffeners (120, 130), and so a strong bond is created between this polyetherimide-rich zone and both the skin and the stiffener. Before welding the stiffener (120, 130) with the skin (110), in an advantageous embodiment, an additional polyetherimide film (212) is introduced between the surfaces in contact with the stiffener (120, 130) and the skin (110).

Figure 3:
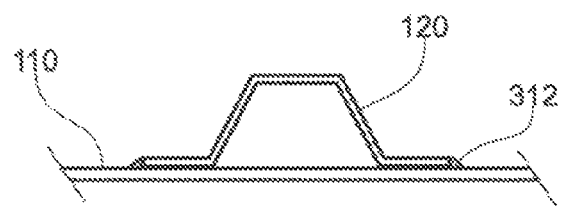
FIG. 3 is a front view of the end of a panel according to an exemplary embodiment of the invention, comprising beads of sealant on the edges of the interfaces between the stiffeners and the skin of said panel.

In FIG. 3, at the end of the welding of the stiffeners (120, 130) the edges of the welds are protected by a bead (312) of sealant made of rubber and polysulphides, such as the sealant distributed under the trade name PR by Le Joint Français®, capable of withstanding phosphate esters such as Skydrol® or Hyjet® used as hydraulic fluids in aeronautics applications.

Figure 4:
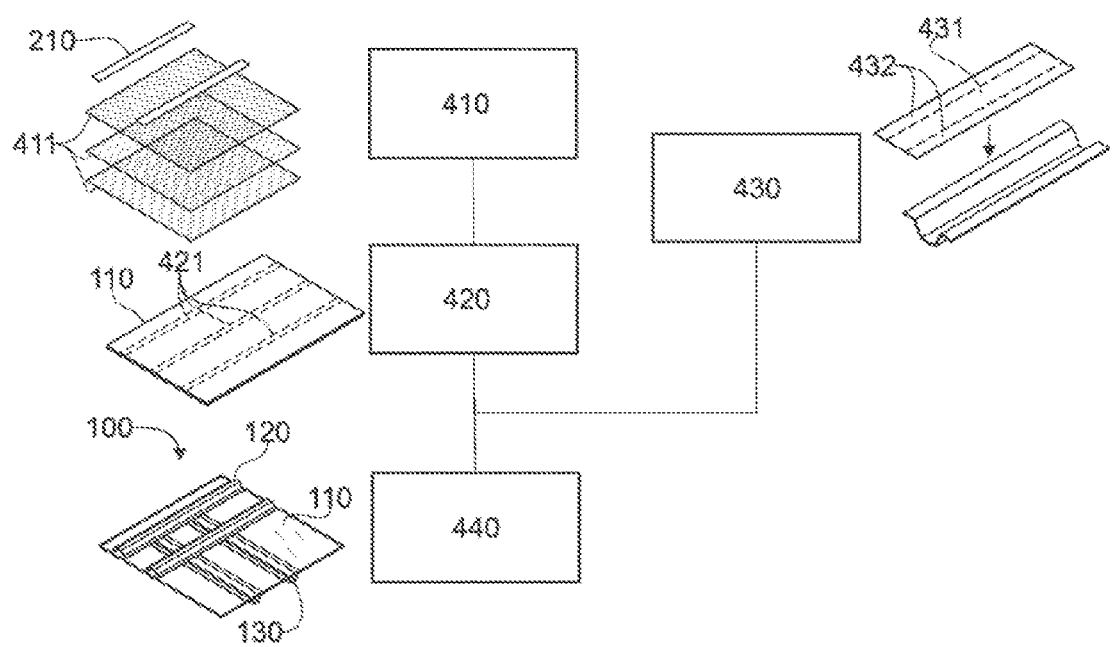
FIG. 4 represents a flow chart of an exemplary embodiment of the method according to the invention.

In FIG. 4, the method according to the invention thus comprises, in one exemplary embodiment, a first step (410) consisting in drape forming the plies (411) of carbon fiber impregnated with thermoplastic resin advantageously made of polyetheretherketone or PEEK with fusion temperature $Tf_1$, and locally placing strips (210) of polyetherimide or PEI with fusion temperature $Tf_2$, at the locations intended for the stiffeners.

The stack of plies (411) is consolidated and compacted during a consolidation step (420), carried out at a temperature greater than or equal to $Tf_1$. At the end of the consolidation step, the skin (110) takes the form of a panel, the composition of which comprises zones (421) that are locally enriched in polyetherimide.

At the same time, stiffeners are made during a step (430) of stamping the pre-consolidated blanks (431).

The skin (110) and the stiffeners (120, 130) are assembled by welding during an assembly step (440) so as to make up a stiffened panel (100). This welding step is carried out at a temperature equal to or greater than $Tf_2$ but less than $Tf_1$ so that the stiffeners (120, 130) and the skin (110) retain their bond during said welding operation.

Figure 5:
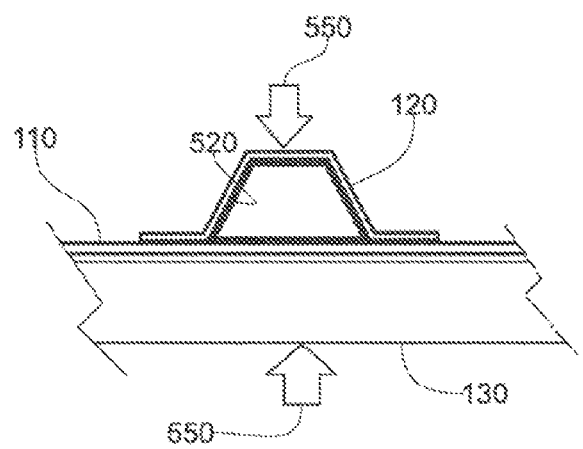
FIG. 5 is a front view of the end of a panel during the operation of welding the stiffeners on the skin.

In FIG. 5, in the case of the use of stiffeners (120, 130) substantially shaped like an Ω that extend along orthogonal directions on each side of the skin (110), welding is carried out by applying pressure (550) on the stiffeners (120, 130), which pressure must be carried away on each side of the skin (110). But even though the welding temperature is below the fusion temperature $Tf_1$ of the resin that makes up most of the stiffeners (120, 130) and the skin (110), the welding temperature $Tf_2$ is however sufficient for reducing the rigidity of these elements. Thus, in order to prevent said stiffeners from collapsing under that pressure, inflatable cores (520) are inserted in the internal space between said stiffeners and the skin (110) in order to support the wings of said stiffeners subjected to pressure (550).

The description above and the exemplary embodiment show that the invention achieves its intended objectives. In particular, it makes it possible to make, economically and in a single step, a double-sided composite panel stiffened by continuous cross stiffeners without using fasteners.

The invention claimed is:

1. A method for producing a stiffened panel comprising a laminated skin extending in two directions, made of a resin and a continuous fiber reinforcement, a first stiffener and a second stiffener, the method comprising the steps of;

drape forming the laminated skin from a continuous fiber reinforcement impregnated with a first thermoplastic resin having a first melting temperature $Tf_1$;

integrating in the drape forming on outer sides of the laminated skin and at predetermined locations for the stiffeners, films of a second thermoplastic resin, the second thermoplastic resin being at least partly miscible in the first thermoplastic resin and having a second melting temperature $Tf_2 \leq Tf_1$ and not being degraded when the second thermoplastic resin is taken to the first melting temperature $Tf_1$;

compacting and consolidating the drape formed skin comprising the films of the second thermoplastic resin at the first melting temperature $Tf_1$ so that the films of the second thermoplastic resin are melted during the compacting and the areas in the predetermined locations are enriched in the second thermoplastic;

making the stiffeners from the continuous fiber reinforcement impregnated with the first thermoplastic resin, each stiffener is in the form of a beam made of a resin with the continuous fiber reinforcement, assembling the skin and the stiffeners to provide an assembly, both in a compacted and consolidated state, by applying a contact pressure on the stiffeners placed on the skin at the predetermined locations and by raising a temperature of the assembly to the second melting temperature $Tf_2$ wherein the first stiffener extends on a first side of the skin in a first direction, the second stiffener extends on a second side of the skin in a second direction, and wherein the resins which make up the skin and the stiffeners are thermoplastic in nature and the stiffeners are closely joined to the skin by welding.

2. The method according to claim 1, further comprising the step of placing a strip made of the second thermoplastic resin at an interface between the skin and the stiffeners at the predetermined locations where the stiffeners are assembled with the skin, before the stiffeners are applied to the skin.

3. The method according to claim 1, wherein the first thermoplastic resin is a polyetheretherketone and the second thermoplastic resin is a polyetherimide.

4. The method according to claim 1, further comprising the step of depositing a sealing agent on edges of the stiffeners at their interface with the skin.

5. The method according to claim 1, wherein the step of making the stiffeners comprises the step of stamping a pre-consolidated blank at the first melting temperature $Tf_1$; and further comprising the step of integrating a layer made of the second thermoplastic resin before stamping on the surfaces of the stiffener to be in contact with the skin at the assembly step, the layer made of the second thermoplastic is melted during the stamping step.

6. The method according to claim 1, wherein at least one of the stiffeners is joined to the skin by two parallel surfaces; and further comprising the step of inserting an inflatable core inside said at least one of the stiffeners between the parallel surfaces of said at least one of the stiffeners welded to the skin.

* * * * *